Aug. 31, 1948. W. H. SCHROEDER Re. 23,034
KITE
Original Filed Jan. 26, 1946
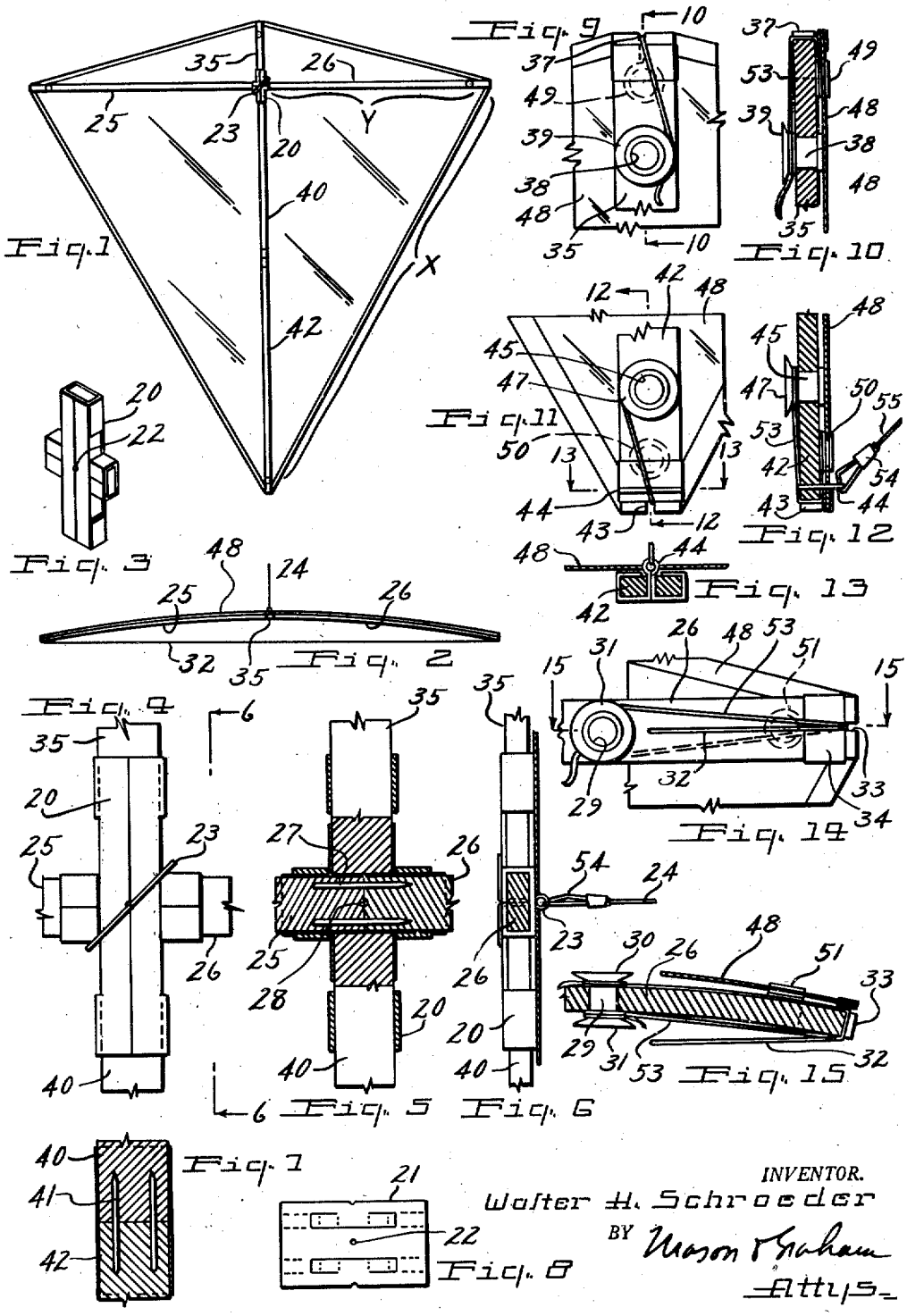
INVENTOR.
Walter H. Schroeder
BY Mason & Graham
Attys.

Reissued Aug. 31, 1948 Re. 23,034

UNITED STATES PATENT OFFICE 23,034

KITE

Walter H. Schroeder, Los Angeles, Calif.

Original No. 2,422,804, June 24, 1947, Serial No. 643,651, January 26, 1946. Application for reissue November 28, 1947, Serial No. 788,333

12 Claims. (Cl. 244—153)

My present invention relates to a kite, and more particularly to a knock-down kite which is capable of being assembled and disassembled re-repeatedly without adversely affecting its flying characteristics.

An object of the present invention is to make an improved demountable kite.

Another object is to make a kite having a central socketed assembly member made from a single piece of sheet metal formed so that the structure will be light and the parts comprising the assembly will mutually brace each other.

Another object is to make a kite having a frame to which a covering may readily be attached in proper adjusted relation, and from which the covering is easily removed.

Another object is to make a kite having a covering of tough, somewhat elastic material, with the peripheral edges thereof bound in tough, relatively non-stretchable material.

Another object is to make a knock-down kite having the composite members thereof in relatively supporting and mutual positioning relation to each other.

These and other objects of the invention will be apparent from the following description and the accompanying drawings, in which:

Fig. 1 is a rear elevational view of a kite embodying the present invention;

Fig. 2 is a lower end view of the kite shown in Fig. 1;

Fig. 3 is a somewhat enlarged view in perspective of a sheet metal structure for joining vertical and horizontal ribs of the kite;

Fig. 4 is a further enlarged fragmentary rear elevational view of the cross frame portion of the kite;

Fig. 5 is a view similar to Fig. 4 with the central portion thereof broken away to show the interior construction;

Fig. 6 is a sectional view on the line 6—6 of Fig. 4;

Fig. 7 is a transverse vertical sectional view through a secondary joint in the vertical rib member;

Fig. 8 is a plan view, to the same scale as Fig. 3, of a sheet metal blank used in making the cross frame bracing member illustrated in Fig. 3;

Fig. 9 is a fragmentary rear elevational view of the kite at the top of the vertical rib, showing a fragment of the covering attached thereto;

Fig. 10 is a sectional view on the line 10—10 of Fig. 9;

Fig. 11 is a fragmentary view similar to Fig. 10, but showing the lower end of the kite;

Fig. 12 is a sectional view on the line 12—12 of Fig. 11;

Fig. 13 is a sectional view on the line 13—13 of Fig. 11;

Fig. 14 is a fragmentary rear elevational view of the outer end of a cross rib showing the method of attaching the covering and a bowing string; and Fig. 15 is a sectional view on the line 15—15 of Fig. 14.

Referring to the drawings in detail, a socketed central framing cross 20, best illustrated in Fig. 3, is formed from a blank 21 of sheet metal, as shown in Fig. 8. The sheet metal used for making this member may be Duralumin of approximately twenty-five thousandths inch in thickness, or other suitable material, such as galvanized sheet steel of approximately the same thickness.

The ilnes of bend are indicated by dotted lines on the blank in Fig. 8, and the device is bent to the cross-like rectangular form illustrated. A hole 22 is drilled entirely through the front and rear walls of the cross at the intersection of its axes.

A cotter key 23 is inserted in the holes 22 and the projecting legs thereof are bent outwardly. This cotter key remains in position throughout the life of the kite. The cotter key 23 serves as a positioning device to limit the insertion of the vertical and transverse rib members, and also serves as a point of attachment for a string 24 used in flying the kite.

A pair of transverse rib members 25 and 26 are preferably of basswood, as are all of the ribs employed in making the kite. The transverse ribs are notched across their inner ends, as at 28 in Fig. 5, to a depth approximately one-half the diameter of the cotter key 23 and are of a size to fit closely within the rectangular sockets in the sides of the frame cross member 20. One of the transverse ribs is provided with a pair of dowel pins 27 (see Fig. 5) which may be of stiff steel wire, and the other transverse rib has a pair of holes drilled to receive these dowels.

Each of the transverse ribs is provided near its outer end with a tubular rivet 29 inserted in a hole drilled through the rib. Fiber washers 30 and 31 are placed under the flanges of the tubular rivet when it is riveted into position, so that these fiber washers will be held by the rivet flanges securely against the front and rear sides respectively of the transverse ribs.

A bowing string 32 is secured beneath one of the front fiber disks 30, as by wrapping it one or two turns around the disk and then drawing tautly on the string to pull it closely in toward the rivet, thus binding it firmly in place. The outer terminal end of each of the transverse ribs is notched, as at 33, to secure the bowing string against displacement and the end of the rib is provided with a wrapping 34 which may be of Cellophane tape, to prevent splitting. The bowing string is carried from its secured position beneath one of the front fiber disks 30 into the notch 33, around the terminal end of one of the transverse ribs, then across and into the notch in the terminal end of the other transverse rib. At this point the entire transverse rib assembly is bowed so that the bowing string 32 is spaced rearwardly from the central cross member a distance equal to approximately one-tenth of the chord of the arc formed by the bowed rib members.

A short upper vertical rib 35 is provided with a notch 37 in its upper end, and a tubular rivet 38 is inserted in an opening drilled transversely through the rib 35 near its upper end. A fiber washer 39 is gripped by the flange of the rivet 38 on the rear side of this upper rib. The upper rib is inserted removably in the socketed upper end of the frame cross member 20. The lower end of the upper rib is forced downwardly into contact with the upper edges of the transverse ribs 25 and 26, within the socketed cross member.

An intermediate lower vertical rib member 40 is adapted to be inserted in the lower opening in the frame cross member 20 and its upper end is brought into contact with the lower edges of the inner end portions of the transverse ribs 25 and 26. The lower end of the intermediate vertical rib member 40 is provided with a pair of steel wire dowels 41 similar to those used in joining the transverse ribs. A lower vertical rib member 42 is provided with a pair of openings drilled in an end thereof to receive the dowels 41 to secure these members together, as illustrated in Figs. 1 and 7.

The lower end of the lower vertical rib member 42 is notched, as at 43, and a cotter key 44 is inserted in an opening drilled inwardly a short distance from the lower end of this lower vertical rib. The eye of the cotter key is toward the front of the kite frame, when assembled, and the legs of the cotter key are bent outwardly, as illustrated in Fig. 13, to secure the cotter key in position.

A tubular rivet 45 is inserted in an opening drilled through the lower vertical rib member above the cotter key 44, and a fiber washer 47 is secured beneath a flange of the tubular rivet on the rear side of the kite when assembled, or, in other words, on the opposite side from the eye of the cotter key 44. The ends of each of the rib members, where subjected to a splitting stress, as for example, where the dowels are mounted, or where the dowel holes are provided, as well as at each of the terminal ends of each of the various rib members, a thin wrapping or coating of tough material, such as Cellophane tape, or a dip-type of coating material, preferably is provided to reinforce these ends and to prevent splitting.

A cover 48 for the kite preferably is of tough, light, water resistant sheet material, cut to a size as illustrated in Fig. 1 to cover the framework of the kite. The cover is edged by folding a strip of adhesive coated relatively non-stretchable material over the edge of the cover material and pressing it into adhesive engagement with the cover material. For the cover I prefer to use the product known as Vitafilm, made by the Goodyear Rubber Company, and for the edge I prefer to use a narrow strip of Scotch tape, made by the Minnesota Mining and Manufacturing Company.

The Vitafilm material has a slight amount of stretchability, although it is not resilient, so that in flight it permits the large lower areas of the cover below the transverse ribs to bell rearward slightly, while the relatively non-stretchable edging prevents the air from spilling out of these bell formed areas and gives the kite excellent flying characteristics.

The cover has four eyelets 49, 50 and 51 (two) spaced inwardly respectively from each of its four corners. Each of these eyelets before being riveted in place, has a short length of string 53 wrapped around beneath the riveted end of the eyelet on the inner side of the covering 48, as best shown in Figs. 10 and 12. A hole is punched in the cover over each of the cotter keys 23 and 44 to permit the eyes of the cotter keys to pass through these openings in the cover. The cover 48 is attached to the framework, preferably beginning at the top of the short upper vertical rib 35 by passing the string 53 secured to the top corner of the cover over the top of the vertical rib so as to lie in the notch 37 in the top of this rib, and then winding the string around the tubular rivet 38 beneath the fiber washer 39.

By drawing the free end of this string 53 taut, the string is wedged beneath the fiber washer and thus is secured in position.

Next, the lower end of the cover is secured by passing the string 53 secured to the lower corner of the cover over the lower end of the vertical rib member 42, positioning the string in the notch 43 in the lower end of the rib, and then wrapping the string tightly beneath the fiber washer 47 secured by the tubular rivet 45. The side corners of the cover then are secured in the position by passing the strings 53 secured to the eyelets in these side corners around the ends of the transverse ribs 25 and 26 and securing the strings in position by wrapping them beneath the fiber washers 31 on the rear of the transverse ribs.

The string 24 for flying the kite preferably is connected to the eye of the cotter key 23 positioned through the frame cross member 20 by means of a wire connector 54 of a type commonly employed to connect a fishing line to a bait. This single connection is all that is necessary for satisfactorily flying the kite. However, additional stability in flying is obtained by attaching a second short line 55 (see Fig. 12) from the cotter key 44 in the lower end of the vertical rib to the main flight line 24 at a distance outwardly from the point of attachment of the main flight line to the cotter key 23 equal approximately to one-half the maximum width of the kite. The length of the short stabilizing line 55 is equal approximately to that of one of the lower diagonal edges of the cover. The length of the short stabilizing line is indicated by the bracket X in Fig. 1, and the distance out from the cotter key 23 at which the stabilizing line 55 is connected to the main flight line 24 is indicated by the bracket Y.

The kite has excellent flying characteristics and is extremely simple to assemble and disassemble. It packs into a very small space, and is capable of being assembled, flown and disassembled time after time without injury.

It will be noted in Fig. 3 that the side sockets of the frame cross member 20 are so positioned that when a rearward bending or bowing moment is applied to the cross ribs 25 and 26, the bending stress will be transmitted to the vertical central edge portions of the cross frame member. This feature makes this a very rigid, light structure and one which is extremely simple and economical to manufacture.

The arrangement of the tubular rivets and fiber washers for assembling the kite also provides for maximum security of the covering with a minimum amount of weight and also greatly simplifies the kite structure. The cotter key 23, in addition to acting as a positioning element to insure proper positioning of all four of the rib members which are united at this point, also serves as an attaching point for the flight line 24.

While I have illustrated a preferred embodiment of my invention, it will be understood by those familiar with the art that the device is capable of some modification, and I do not desire to limit the invention except as defined in the appended claims.

I claim :

1. A demountable kite comprising a socketed frame member, a central positioning pin mounted therein, a pair of transverse kite ribs inserted in the socketed member and having endwise engagement with the pin, an upper kite rib inserted in the socketed member and having endwise engagement with a transverse kite rib, a lower kite rib inserted in the socketed member and having endwise engagement with a side of a transverse kite rib, string securing means mounted adjacent the terminal end of each rib, a cover shaped to cover the area defined by the rib members, a plurality of eyelets secured to the cover and adapted to be positioned one adjacent the terminal end of each rib member, and a string connected to each eyelet and adapted to pass over a rib end to be secured removably to the string securing means thereby removably to attach the cover in position.

2. A demountable kite comprising a central socketed frame member formed of sheet metal, the blank for the socketed frame member being provided with a pair of internal U-shaped slots with return slots at the ends of the U, the body of the blank being bent to comprise a tubular pair of sockets and the slotted U portions being bent to form a second pair of sockets transverse to the tube sockets, a pair of kite ribs removably inserted in one pair of sockets of the socketed member and having endwise abutting relation with each other, a second pair of kite ribs mounted in the other pair of sockets and having abutting relation with the first ribs, and a cover shaped to conform to the outline defined by the terminal ends of the kite ribs and removably secured thereto.

3. A demountable kite comprising a central socketed frame member formed from a rectangular blank of sheet metal, the blank for the socketed frame member having a pair of internal U-shaped slots with return slots at the ends of the U, the body of the blank being bent to comprise a tubular pair of sockets and the slotted U portions being bent to form a second pair of sockets transverse to the tube sockets, the sockets formed by the slotted U portions having abutting edgewise supported engagement with the body tubular sockets, a positioning member mounted centrally of the socketed member, a pair of kite ribs removably inserted in one pair of sockets of the socketed member and having endwise abutting relation with the positioning member, a second pair of kite ribs removably mounted in the other pair of sockets and having endwise abutting relation with a side portion of the first ribs, and a cover shaped to conform to the outline defined by the terminal ends of the kite ribs and removably secured thereto.

4. A demountable kite comprising a central socketed frame member formed of sheet metal, the blank for the socketed frame member being rectangular and provided with a pair of internal U-shaped slots with return slots at the ends of the U, the body of the blank being bent to comprise a tubular pair of sockets and the slotted U portions being bent to form a second pair of sockets transverse to the tube sockets, the sockets formed by the slotted U portions having abutting edgewise supported engagement with the body tubular sockets, a positioning member mounted centrally of the socketed member and having a line connecting eye carried by the socketed member, a pair of kite ribs removably inserted in one pair of sockets of the socketed member and having endwise abutting relation with the positioning member, a second pair of kite ribs removably mounted in the other pair of sockets and having abutting relation with the first ribs, and a cover shaped to conform to the outline defined by the terminal ends of the kite ribs and removably secured thereto, the cover having an opening therein positioned to pass the line connecting eye therethrough.

5. In a demountable kite, a frame comprising a rib support, a plurality of ribs removably connected to the rib support to form a cross shaped kite frame, two transverse ribs of the cross shaped frame being symmetrical and a top and a bottom rib being unsymmetrical, each of said ribs having a notched terminal end, a relatively stiff but somewhat flexible washer secured to each rib to lie closely against a rib surface, a cover shaped to cover the kite frame, and a plurality of flexible strands connected to the cover to lie one adjacent the terminal end of each rib of the kite frame when the cover is placed thereon, the strands being adapted to overlie the notched ends of the ribs and to be drawn closely beneath said washers, removably to secure the cover to the frame.

6. In a demountable kite a frame comprising a rib support, a plurality of ribs removably connected to said rib support to form a cross shaped kite frame, the transverse ribs of the cross being symmetrical and the top and bottom ribs being unsymmetrical, each of said ribs having a notched terminal end, a plurality of relatively stiff but somewhat flexible first washers, means securing one of said first washers to each rib to lie closely against a rib surface, an additional similar washer secured to each of the transverse ribs on the opposite side of the rib from, but secured by the same securing means as the first washers thereon, a bowing line removably secured beneath the additional washers and passing over the ends of the transverse ribs to be in the notches therein, the bowing line exerting a predetermined bowing stress on the transverse ribs, a cover shaped to cover the kite frame and a plurality of flexible strands connected to the cover to lie one adjacent the terminal end of each rib of the kite frame when the cover is placed thereon, the strands being adapted to overlie the notched ends of the ribs and to be drawn closely beneath said first washers, removably to secure the cover to the frame.

7. A demountable kite comprising a central socketed frame member formed of sheet metal, the blank for the socketed frame member being provided with a pair of internal U-shaped slots, with return slots at the ends of the U, the body of the blank being bent to comprise a tubular pair of sockets, the slotted U portions being bent to form a second pair of sockets transverse to the tube sockets, a plurality of kite ribs inserted in said sockets to form a cross-shaped kite frame, and a cover removably secured to the terminal ends of said ribs.

8. A demountable kite comprising a central socketed frame member formed of sheet metal, the blank for the socketed frame member being provided with a pair of internal U-shaped slots, with return slots at the ends of the U, the body of the blank being bent to comprise a tubular pair of sockets, the slotted U portions being bent to form a second pair of sockets transverse to the tube sockets, a kite rib inserted in one pair of said sockets, a pair of other kite ribs inserted in the other pair of sockets to have endwise abutment with the first rib, to form a cross-shaped kite frame, and a cover removably secured to the terminal ends of said ribs.

9. A demountable kite comprising a cross socketed frame member, a rib member inserted in the socketed member, a second rib member inserted in the socketed member and having endwise abutting engagement with said first rib, a third rib member inserted in the socketed member and having endwise engagement with a side of the first and second rib members and a fourth rib member inserted in said socketed member and having endwise engagement with an opposite side of said first and second rib members, to form a cross-shaped kite frame, a cover shaped to cover the area defined by the rib members, removable cover attaching means mounted adjacent the outer end of each rib, and cooperating cover attaching means mounted on said cover to be positioned adjacent a terminal end of each rib.

10. A demountable kite comprising a cross socketed frame member, a first rib member inserted in the socketed member, a positioning pin inserted through said socketed member and having positioning engagement with said first rib member, a second rib member inserted in the socketed member and having endwise abutting engagement with said first rib, a third rib member inserted in the socketed member and having endwise engagement with a side of the first and second rib members and a fourth rib member inserted in said socketed member and having endwise engagement with an opposite side of said first and second rib members, to form a cross-shaped kite frame, a cover shaped to cover the area defined by the rib members, removable cover attaching means mounted adjacent the outer end of each rib, and cooperating cover attaching means mounted on said cover to be positioned adjacent a terminal end of each rib.

11. A demountable kite comprising a central cross socketed frame member, formed from a sheet metal blank, a pair of oppositely directed tabs cut from the metal of said blank on each side thereof, the body of the blank being bent to define a tubular socket, the tabs being bent to define sockets transverse to the socket formed by bending the body, the tabs when so bent having abutting edgewise supported engagement with the body tubular socket, a plurality of kite ribs inserted in said sockets, and a cover shaped to conform to the outline defined by the terminal ends of the kite ribs and removably secured thereto.

12. A demountable kite comprising a central cross socketed frame member, formed from a rectangular blank of sheet metal, a pair of oppositely directed tabs cut from the metal of said blank on each side thereof, the body of the blank being bent to define a tubular socket, the tabs being bent to define a second socket transverse to the socket formed by bending the body, the tabs when so bent having abutting edgewise supported engagement with the body tubular socket, a kite rib inserted in one of said sockets, and a second kite rib inserted in another of said sockets to form a cross shaped kite frame and a cover shaped to conform to the outline defined by the terminal ends of the kite ribs and removably secured thereto.

WALTER H. SCHROEDER.

REFERENCES CITED

The following references are of record in the file of this patent:

UNITED STATES PATENTS

| Number | Name | Date |
|---|---|---|
| 368,525 | Fleharty | Aug. 16, 1887 |
| 1,456,260 | Trombley | May 22, 1923 |